Figure 1:
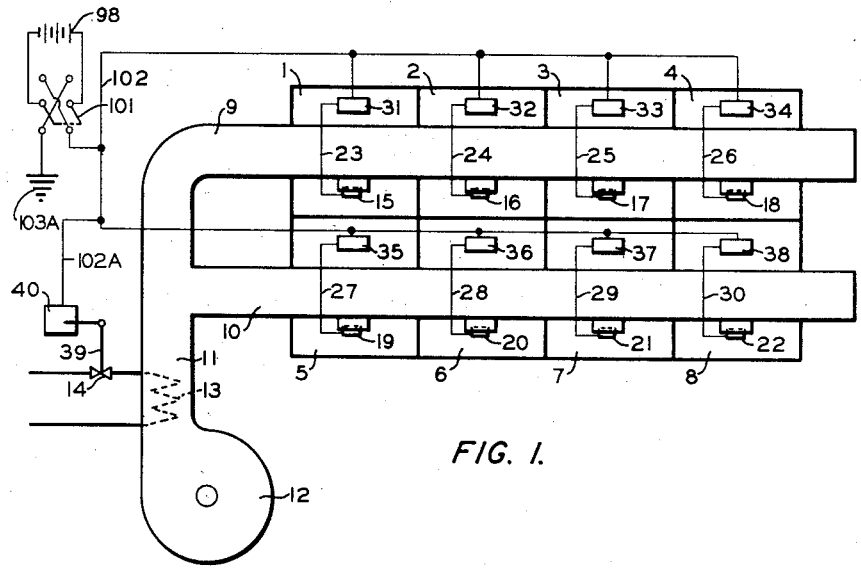

Dec. 29, 1953  E. M. MILLER  2,664,244
AIR CONDITIONING CONTROL APPARATUS
Filed May 16, 1950

INVENTOR.
E. M. MILLER
BY
Hudson & Young
ATTORNEYS

Patented Dec. 29, 1953

2,664,244

UNITED STATES PATENT OFFICE 2,664,244

AIR CONDITIONING CONTROL APPARATUS

Enoch Merle Miller, Bartlesville, Okla., assignor to Phillips Petroleum Company, a corporation of Delaware Application May 16, 1950, Serial No. 162,308

7 Claims. (Cl. 236—1)

This invention relates to air conditioning systems and a means of control therefor. In one of its aspects, it relates to modutrol motors adaptable to be employed in an air conditioning system and to a means for remotely controlling such motors. In another of its aspects, this invention relates to a means for controlling a plurality of modutrol motors from a single remote control unit. In still another of its aspects, this invention relates to a snap-acting switch especially adapted to be employed in a modutrol motor control system.

Modutrol motors for controlling the opening or closing of dampers, refrigerant control valves, heating medium control valves and the like during the heating or cooling cycle of an air conditioning system, are well-known in the art. In such an air conditioning system which is adapted to function the year round to provide suitable heating during the winter months there must be provided a means for converting the modutrol motors from winter operation to summer operation. For example, during the winter months, the function of the modutrol motors is to open a valve controlling the heating medium flowing into an air conditioning system or space whenever the temperature in the conditioned space decreases. During such period, the motor may have an additional function of opening conditioned air dampers to each space in order to provide additional heating in such space. In those systems where the temperature of the conditioned air is controlled by the admission of cold fresh air from a point external of the system, it is a function of the motors to decrease the amount of air, for example, whenever the temperature inside the conditioned spaces decreases. During summertime operation, the function of the modutrol motor is opposite to that during wintertime operation. Thus, with a decrease in temperature in the air conditioned spaces, it is necessary for the modutrol motors to close a valve controlling the introduction of refrigerating medium into the air conditioning apparatus. Or, where the modutrol motors control the opening and closing of dampers into an air conditioned space, the motor must close the damper whenever the temperature within such space decreases. Accordingly, as stated, it is necessary to convert the operation of the modutrol motors from one function for wintertime operation to an opposite function during summertime operation. In the prior art, such conversion has been accomplished by manually converting each modutrol motor in the air conditioning system at the time changeover from wintertime to summertime operation and at the time changeover from summertime to wintertime operation is made. Such a changeover system has many disadvantages. For example, in an ordinary air conditioning system in a large building where there will ordinarily exist a great many modutrol motors, perhaps even hundreds of them, it is necessary to convert each motor individually from one type of operation to the other so that such conversion is necessarily very time consuming. In addition, in many parts of the country where the weather is extremely changeable, it would be highly desirable to have the modutrol motors alternately on wintertime and summertime operation for short periods of time during the year. Thus, in the spring and fall there will be many days when it will be necessary to cool the air conditioned spaces and many succeeding days when it will be necessary to heat such spaces. It may even be desirable to heat the spaces early in the morning and to cool them during the noontime heat. Obviously, in such systems where there are hundreds of modutrol motors where each must be manually converted from one type of operation to the other, such short time changeover is not feasible. Accordingly, it would be highly desirable in the air conditioning art to possess a means for changing modutrol motors from heating operation to a cooling operation wherein such means function in a very short period of time with a minimum of manual labor and can be switched from one type of operation to another upon a moment's notice.

It is an object of this invention to provide an air conditioning apparatus which can be readily converted from a heating to a cooling operation, or vice versa.

It is another object to provide a means for converting modutrol motors from a heating operation to a cooling operation or vice versa within a minimum time and with a minimum of expense.

It is another object of this invention to provide a means for converting a plurality of modutrol motors from a heating operation to a cooling operation or vice versa at a single point remotely removed therefrom.

It is still another object of this invention to provide a means for converting a plurality of modutrol motors from a heating operation to a cooling operation, or vice versa.

Yet another object is to provide a snap-acting switch especially adapted to be employed in the modutrol apparatus of this invention.

3

Figure 2:
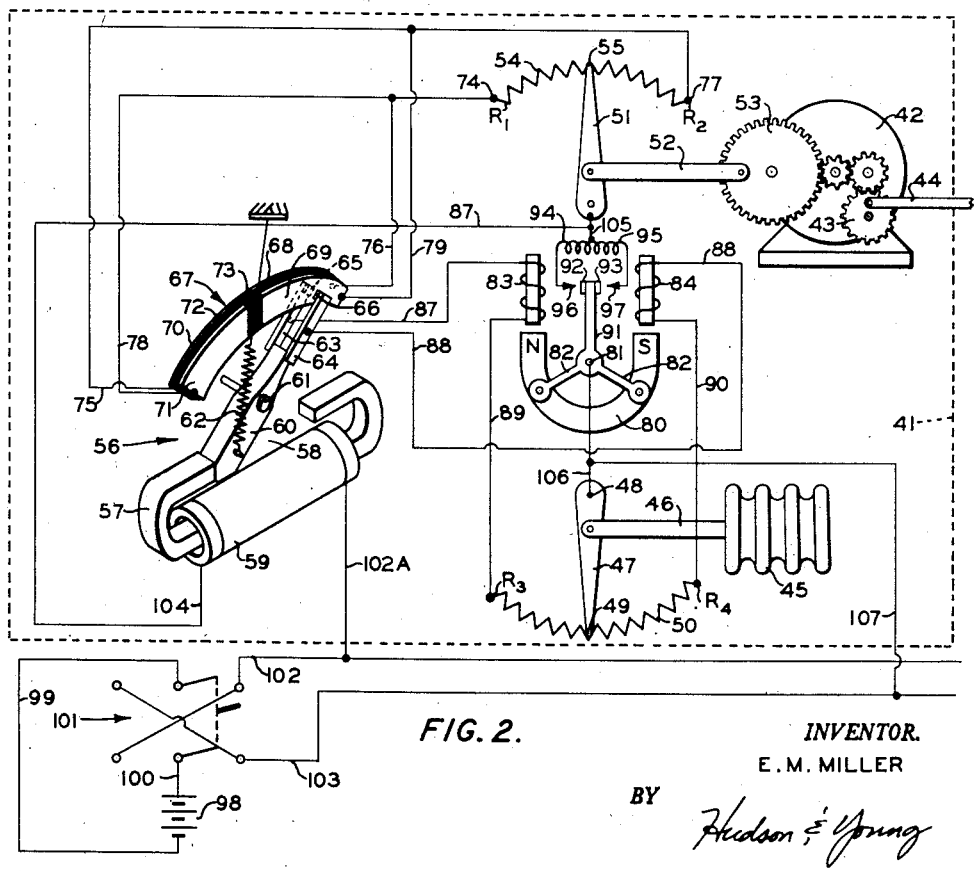

Various other objects, advantages and features of the invention will become apparent from the following description taken in conjunction with the accompanying drawings, in which:

Figure 1 is a diagrammatic sketch of an air conditioning system employing the apparatus of this invention. Figure 2 is a diagrammatic illustration of a portion of the apparatus shown in Figure 1.

Referring now to Figure 1, a plurality of spaces 1 to 8 are to be individually air conditioned by means of conditioned air passing through conduits 9, 10 and 11 from blower 12. The air passing through conduit 11 is heated or cooled, as desired, by means of coil 13, which contains a suitable heating or cooling medium in a manner well-known to the art. Valve 14 is provided to control the rate of admission of heating or cooling medium to coil 13. Dampers 15 to 22 are situated in openings from ducts 9 and 10 into each of the individual spaces which are to be air conditioned and serve to control the amount of conditioned air admitted to each of these spaces. Operatively connected to each of the dampers by means of linkages 23 to 30, are damper actuating units 31 to 38. Valve 14 is connected by means of linkage 39 to an actuating mechanism 40. Actuating mechanisms 31 to 38 and 40 are termed modutrol motors and comprise a reversible electrical motor operatively connected to the linkages 23 to 30 and 39 so that the dampers or valves connected to such linkages can be opened and closed depending upon the direction of rotation of the electrical motor. The direction of rotation of the electrical motor is controlled by controlling mechanism shown in detail in Figure 2.

Referring to Figure 2, the apparatus within the dashed outline 41 corresponds to the actuating mechanisms 31 to 38 and 40 of Figure 1 and electric motor 42 is connected through gears 43 to an operating linkage 44 which, in turn, is operated to open and close the valves or dampers as above-described. A temperature-sensitive mechanism 45 is connected by means of linkage 46 to wiper arm 47 which is pivoted about a point 48 and forms an electrical contact 49 with a control variable impedance such as resistance 50. The temperature-sensitive means 45 can be any one of various types well-known to the art, such as an extendable bellows filled with a thermally expansible fluid. Motor 42 is connected to wiper arm 51 by means of linkage 52 and actuating gear 53 in such fashion that rotation of motor 42 will cause wiper arm 51 to move back and forth across a balancing variable impedance such as resistance 54, thereby varying the position of contact point 55 of wiper arm 51 on such resistance.

A snap-acting relay switch designated generally as 56 is employed as a double-throw, double-pole switch adapted to reverse the direction of current flow through resistance 54. Relay 56 is comprised of a magnetizable core 57 which can have a C-shape to form a gap 58 therein. Coil 59 is situated around a portion of the armature to act as a magnetizing means therefor. Situated in gap 58 of armature 57 is a pivoted permanent magnet 60 which is biased about pivot point 61 by means of spring 62 so that magnet 60 will be urged by spring 62 against one or the other of the ends of armature 57, as shown. Extending from magnet 60 are contact arms 63 and 64 having situated on their ends contact points 65 and 66. A contact member 67 is comprised of electrically conductive contact strips of material 68, 69, 70 and 71, each of these strips of material being in-

4 sulated one from the other by means of insulating medium 72 and a central insulating block 73. The contact member can be formed in an arc about pivot point 61 of magnet 60 so that contact points 65 and 66 can swing back and forth along abutting contact strips 68 and 70 and along 69 and 71, respectively, to establish contact with said contact members.

End 74 of resistance 54 is connected by means of wire 76 to contact strip 71 and by means of wire 76 to contact strip 68. The opposite end 77 of resistance 54 is connected by means of wire 75 to contact strip 70 and by means of wire 79 to contact strip 69.

A relay means is provided to be actuated by an unbalanced condition of current flow through control variable impedance 50 and balancing variable impedance 54. The relay means will then actuate motor 42 to cause it to rotate in such a direction as to rebalance the circuit comprising impedances 50 and 54 and to open or close means for correcting the changed condition in the air conditioned space. The relay means has a U-shaped permanent magnet 80 having north and south poles, as shown, which is mounted to pivot about point 81 by means of arms 82. Opposite and adjacent each pole of magnet 80 are situated electromagnets 83 and 84. One end of electromagnet 83 is connected by means of wire 87 to slideable contact 85 and one end of electromagnet 84 is connected by means of wire 88 to the opposing slideable contact 86. The opposite end of electromagnet 83 is connected by wire 89 to one end of resistance 50 while the other end of electromagnet 84 is connected by wire 90 to the other end of resistance 50, as shown. Electromagnets 83 and 84 are wound in such a direction that electrical energy flowing from resistance 50 through lines 89 and 90 will cause them to be magnetized in such a manner that both will either attract or repel the pole of magnet 80 opposite therefrom. Thus, any unbalanced magnetization of electromagnets 83 and 84 will cause a net rotative force to be exerted against the poles of magnet 80 in such a manner that it will cause rotation about pivot point 81.

Attached to supporting arms 82 is an elongated member 91 bearing contact points 92 and 93 at its end, as shown. For the sake of clarity of illustration, coil 94 and coil 95 are shown as separate coils in Figure 2, however, coils 94 and 95 actually form the field coils of motor 42 and are so arranged in the motor that when current is flowing through coil 94 the motor will rotate in one direction but when current is flowing through coil 95 the motor will rotate in an opposite direction. The ends of coils 94 and 95 are connected to contact points 96 and 97, as shown.

A source of D. C. power 98, which can be a battery or other means well-known to the art, is connected by means of wires 99 and 100 to a double-throw, double-pole switch 101. Switch 101, as shown, is adapted to reverse the polarity of wires 102 and 103 in a manner well-known to those skilled in the art. Wire 102 can lead to a plurality of the actuating mechanisms as shown in Figures 1 and 2, each of which is connected to the wire 102 by means of a wire 102A, which, in turn, is connected to one end of coil 59. The other end of coil 59 is connected by means of wire 104 to wire 105, which connects the ends of coils 94 and 95 to wiper arm 51. Wire 103 is connected to wire 106 by means of wire 107. Alternatively, wire 103 can be grounded as can be wire 107, thereby eliminating the necessity of employing two wires to each of the actuating mechanisms, as shown in Figure 2 to use only a single wire 102 and a ground 103A as shown in Figure 1.

In discussing the operation of the apparatus of this invention, assume the air conditioning system is in summertime, i. e. cooling service. Hence, upon an increase in temperature in air conditioned spaces 1 to 8, it will be necessary for modutrol motor 42 to open valve 14 to admit additional cooling medium to coil 13. Or, modutrol motors 31 to 38 will open dampers 15 to 22 in order to permit more cooled air to enter the air conditioned spaces. Referring in particular to Figure 2, assume that switch 101 is thrown to the right so that wire 99 is connected to wire 102 and assume, further, that wire 102 is negative with respect to wire 103. Further, assume that the wiper arms 47 and 51 are positioned along resistances 50 and 54, respectively, in such a manner that resistance $R_1$ equals resistance $R_3$ and resistance $R_2$ equals resistance $R_4$. Current will flow through wire 107 and wiper arm 47 and be divided at contact point 49 so that an equal amount of current will flow through electromagnets 83 and 84, respectively. As a result, electromagnets 83 and 84 will exert a balanced force against the poles of magnet 80, thereby maintaining contact arm 91 and contact points 92 and 93 in an intermediate and non-contacting position with respect to contact points 96 and 97. Current leaving electromagnet 83 flows through wire 87, contact arm 63, contact strip 68 and, thence, through wire 76 to terminal 74 of resistance 54. Current leaving electromagnet 84 flows through wire 88, contact arm 64, contact strip 69 and then through wire 79 to terminal 77 of resistance 54. The current flowing through resistance 54 from each of terminals 77 and 74 will flow through wiper arm 51, wire 87, coil 59 and then through wire 102A back to the source of current 98. Coil 59 is so wound as to magnetize armature 57 and attract magnet 60 to the position shown in the drawing. Thus, in effect, equal amounts of current flow through each of electromagnets 83 and 84 and through resistances $R_3$ and $R_4$ when the control apparatus for motor 42 is in a balanced position.

Now assuming that the temperature in an air conditioning space increases, temperature-sensitive element 45 will expand pushing wiper arm 47 to the left, thereby increasing resistance $R_4$ with respect to resistance $R_3$. As a result, more current will flow through $R_3$ and electromagnet 83 than through $R_4$ and electromagnet 84. The increased current flowing through electromagnet 83 with respect to electromagnet 84 causes magnet 80 to pivot about point 81, thereby contacting contact points 93 and 97 to permit current to flow through wire 106, contact arm 91 to coil 95 which, as stated, is a field coil of motor 42. As a result, motor 42, operating through linkage 44, acts to open a refrigerant valve or a damper in order to decrease the temperature in the air conditioned space. In so doing, the motor also pushes wiper arm 51 to the right and will continue to do so until $R_1$ equals $R_4$ and $R_2$ equals $R_3$ thereby again balancing the circuit so that the current flowing through electromagnet 83 again equals that flowing through electromagnet 84 and contact point 93 is separated from contact point 97, thereby stopping the motor. With a decrease in temperature in the air conditioned space, a reaction opposite to that described above will take place, resulting in energization of field coil 94 of motor 42 so that the motor will rotate in an opposite direction to close the refrigerant valve or the damper.

When it is desired to convert the control mechanism, shown in Figure 2, to wintertime operation, that is, to control motor 42 so that it will close a heating medium control valve or close a damper with an increase in temperature in an air conditioned space, it is necessary to merely throw switch 101 to the poles opposite those described above. That is, in the case of this example, switch 101 will be thrown to the left so that wire 102 becomes positive with respect to wire 103. In so doing, the polarity of coil 59 is reversed and the poles of armature 57 are likewise reversed, so that magnet 60 is attracted to a position opposite that shown in the drawing. In reversing the polarity of armature 57, magnet 60 is held in the position shown by spring 62 until the polarity is completely reversed and the electromagnet attraction has increased sufficiently to attract magnet 60 to a position opposite that shown in the drawing and to overcome the reaction of spring 62. As magnet 60 is pulled from the position shown in the drawing, the contact points on contact arms 63 and 64 slide along contact strips 70 and 71 without breaking the established circuit until they reach insulating material 73. After the aforesaid contact points reach insulating material 73, spring 62 will be in a neutral position with respect to its pivoting force upon magnet 60. Immediately after the contact points leave insulating material 73, spring 62 acts to exert a force on magnet 60, which complements the force exerted thereon by the reversed polarity of armature 57, thereby causing magnet 60 to snap into its new position opposite that shown in the drawing. With this manner of construction, the snap-acting double-throw, double-pole electromagnetic switch is capable of maintaining a circuit during the greater proportion of the time which elapses in changeover from one position to another position and the action of spring 62 is such that the switch is given a snap action.

After the polarity of the balancing variable impedance means has been reversed, that is, the terminals 74 and 77 of balancing variable impedance 54 have been reversed with respect to control variable impedance 50 so that terminals 74 and 77 are disconnected from electromagnets 83 and 84, respectively, and connected to electromagnets 84 and 83, respectively, as above described by placing snap-acting switch 56 in a position opposite to that shown in the drawing, current flowing through line 102 and line 104 and wiper arm 51 will be divided at contact point 55 when the control mechanism is in a balanced position and equal amounts of current will flow through $R_1$ and $R_2$. The current flowing from $R_2$ through wire 75 will flow through contact strip 70 and, thence, out through wire 87 to electromagnet 83. Current flowing from $R_1$ through line 78 flows through contact strip 71 and wire 88 to electromagnet 84. The current flowing from the electromagnets will then pass through the wires 89 and 90 and $R_3$ and $R_4$, respectively, through wiper arm 47 and then through wire 107 back to the source of current 98. If it is assumed that the temperature in the air conditioned space increases so that temperature-sensitive element 45 pushes wiper arm 57 to the left, a greater amount of current will flow through wire 89 and electromagnet 83 than through wire 90 and electromagnet 84, thereby causing magnet 80 to rotate in such a manner that coil 94 of motor 42 is energized to rotate the motor to close the damper or the heating medium control valve. In so rotating, wiper arm 51 will be pulled to the left until it reaches a position such that R1 equals R3 at which point the current flowing through electromagnets 83 and 84 will be equal, thereby breaking the circuit to the field coil 94 of the motor 42.

It will be obvious from the foregoing description of the apparatus of this invention that it is possible to control, i. e. to convert from summertime to wintertime operation or vice versa, a great many modutrol motors by duplicating for each motor the apparatus shown in the broad portion of Figure 2. These motors can be scattered over many floors of a large building. Thus, when employing the apparatus of this invention, it will be a simple matter to convert these units from wintertime to summertime operation or vice versa by merely throwing switch 101 to one position or the other to reverse the polarity of modutrol motors and without necessarily having to manually convert each individual motor to an opposite polarity by mechanically changing the leads to the modutrol motor, as is now the practice.

Still further, it will be possible to more closely control an air conditioning system when employing the apparatus of this invention because, as stated, it will be possible to convert the modutrol motors from one type of operation to the other as many times per day as is wished whereas such conversion is not possible with the systems now in use because of the physical impossibility of manually converting each modutrol motor from one type of operation to the other. This particular feature of this invention is highly advantageous in climates which are extremely changeable and is particularly advantageous during the spring and fall when the weather in almost any climate may be cool one day and hot the next.

While the invention has been described in connection with present preferred embodiments thereof, it is to be understood that this description is illustrative only and is not intended to limit the invention, the scope of which is defined by the appended claims.

I claim:

1. A control system for a motor which comprises, in combination, a reversible motor, a normally balanced circuit comprising two normally balanced impedance paths, an electromagnetic relay associated with said impedance paths adapted to reverse the direction of rotation of said motor responsive to an unbalanced condition of said impedance paths, means for unbalancing said impedance paths, means responsive to the rotation of said motor for rebalancing said impedance paths, a switch for reversing the polarity of one of said impedance paths with respect to the other of said impedance paths and said electromagnetic relay and means for actuating said switch.

2. In a control system for a motor, a reversible motor, a normally balanced circuit having two normally equal impedance paths, an electromagnetic relay controller controlling said motor and adapted to cause said motor to be reversed in direction of rotation responsive to an unbalanced condition of said impedance paths, means for varying the relative impedance of said impedance paths to unbalance said circuit, means responsive to the rotation of said motor for rebalancing said impedance paths, an electromagnetic switch for reversing the polarity of said means for rebalancing said impedance paths, and means for reversing the position of said electromagnetic switch.

3. In combination, a device to be positioned in a plurality of positions to control the value of a condition, control variable resistance means, means responsive to changes in the value of the condition to be controlled for adjusting automatically said control variable resistance means, relay means for controlling the operation of said device, balancing variable resistance means operated by said device, connections between said relay means, said control variable resistance means and said balancing variable resistance means for positioning said device in accordance with changes in the value of the condition to be controlled, means for changing the polarity of said balancing variable resistance means with respect to said relay means and means for reversing the polarity of said control variable resistance means, said relay means and said balancing variable resistance means.

4. In combination, a device to be positioned in a plurality of positions to control the value of a condition, control variable impedance means, means responsive to changes in the value of the condition to be controlled for adjusting automatically said control variable impedance means, relay means for controlling the operation of said device, balancing variable impedance means operated by said device, connections between said relay means, said control variable impedance means and said balancing variable impedance means for positioning said device in accordance with changes in the value of the condition to be controlled, means for changing the polarity of said balancing variable impedance means with respect to said relay means and means for reversing the polarity of said control variable impedance means, said relay means and said balancing variable impedance means.

5. An air conditioning system for a building having a plurality of spaces, which comprises, in combination, an air conditioning unit adapted to deliver heated or cooled air to each of said spaces, a motor controlled damper for each of said spaces for regulating the volume of air delivered thereto in accordance with the temperature in said space; a plurality of motor control means each associated with one of said motors to thereby control the opening and closing of each said damper each of which comprises a normally balanced circuit having a control variable impedance means responsive to changes in temperature in said space, relay means for controlling the direction of rotation of said motor, balancing variable impedance means operated by said motor, connections between said relay means, said control variable impedance means and said balancing variable impedance means adapted to permit said relay to control the direction of rotation of said motor responsive to the variation in impedance of said control variable impedance means and being further adapted to cause said motor to vary the impedance of said balancing variable impedance means in such a manner that said circuit will become balanced thereby stopping the rotation of said motor, means for reversing the polarity of said balancing impedance means with respect to said relay means and said control impedance means; and a single means for reversing the polarity of said control variable impedance means, said relay means and said balancing variable impedance means in each of said plurality of motor means associated with each of said motors.

6. The apparatus of claim 5 wherein the means for reversing the polarity of said control variable impedance means, said relay means and said balancing impedance means comprises a double-throw, double-pole switch adapted to reverse the polarity of a source of direct current with respect to the aforesaid means.

7. The apparatus of claim 5 wherein the means for reversing the polarity of said balancing impedance means with respect to said relay means and said control variable impedance means comprises a snap-acting switch adapted to operate in response to a reversal in polarity of a source of direct current with which said switch is connected in a two wire system.

ENOCH MERLE MILLER.

References Cited in the file of this patent

UNITED STATES PATENTS

| Number | Name | Date |
| --- | --- | --- |
| 2,036,277 | Johnson | Apr. 4, 1936 |
| 2,132,960 | Montrose-Oster | Oct. 11, 1938 |
| 2,177,597 | Haines | Oct. 24, 1939 |
| 2,196,687 | Steinfield | Apr. 9, 1940 |
| 2,269,036 | Nessell | Jan. 6, 1942 |
| 2,274,614 | Nessell | Feb. 24, 1942 |
| 2,294,210 | Roters | Aug. 25, 1942 |
| 2,418,395 | Carlson | Apr. 1, 1947 |
| 2,437,726 | Davis | Mar. 16, 1948 |

OTHER REFERENCES

"Electronic Computers" by William Shannon—Electronics, pp. 110 to 113, August 1946.